United States Patent Office 3,501,329
Patented Mar. 17, 1970

3,501,329
PROCESS FOR PREPARING FLOCKED MATERIAL
Edward W. Kent, Lynnfield, Mass., assignor to General Latex & Chemical Corporation, Cambridge, Mass., a corporation of Massachusetts
No Drawing. Filed Dec. 3, 1964, Ser. No. 415,796
Int. Cl. B44d 1/09, 1/20; C09d 3/48
U.S. Cl. 117—33                     14 Claims

ABSTRACT OF THE DISCLOSURE

Improved adhesives for use in preparing flocked materials wherein the adhesive is coated on a porous base such as woven or non-woven cloths, paper, etc., the flock is applied to the coated base and oriented so that a substantial portion of the lengths of the flock are generally perpendicular to the base and the adhesive is cured to set the flock in the oriented position. The flocking adhesives disclosed comprise a prepolymer having reactable isocyanato groups, a linear-polymer-forming polyol and a small amount of a diamine in which both amino groups are reactive with the isocyanato groups of the prepolymer. The diamine is selected from the group consisting of cycloaliphatic diamines, aromatic diamines, mixed alkyl-cycloaliphatic diamines, mixed alkyl-aromatic diamines and aliphatic diamines in which at least one of the amino groups in the aliphatic diamine is secondary. The flocking compositions are shown to have enough open or tack time to allow a sufficient amount of the flock to attach itself and then become oriented while having sufficient body to hold the flock in its oriented state prior to the cure. Additionally, these materials have controlled permeation through the porous base so that they will remain on the surface where they are needed. Further, the disclosed flocking adhesives do not become fluid whereby the flock would be caused to lose its orientation when the coated base is exposed to heat during the curing cycle.

---

The present invention is concerned with flocking compositions and more particularly with polyurethane flocking adhesives for preparing flocked materials.

Such flocked materials are generally prepared by coating a thin film of the flocking adhesives to a suitable base e.g., woven or non-woven cloth and applying the flock thereto. The flock is preferably applied in a manner such that only one of its ends becomes adhered to the flocking adhesive. When sufficient flock has been applied, the base is brought into contact with means for orienting the flock i.e., arranging the flock so that a substantial portion of the lengths are perpendicular to the plane of the base material. Suitable mechanical or electrostatic means for orienting the flock are known to the art. Subsequent to orientation the flocking adhesive is cured, usually by heating, to set the flock in the oriented position. As can be noted the flocking adhesive has to be tacky and have enough open or tack time to allow a sufficient amount of the flock to attach itself and then be oriented. Also the flocking adhesive must have sufficient body to hold the flock into oriented state prior to the cure and to have controlled permeation through the porous base so that it will remain on the surface where it is needed. Further and no less important, it is necessary that the flocking adhesive not become fluid and cause the flock to lose its orientation when the flocked sheet is exposed to heat during the curing cycle. In the past, it has been quite difficult to produce a polyurethane flocking adhesive possessing all these properties. Usually one of these properties had to be gained at the expense of one or more of the others. The present invention provides polyurethane flocking compositions which possess the combination of the above desirable features. It further provides flocking compositions which can be used in solvent-less systems, cure in about 10 to 20 minutes, have long pot life in closed containers, have water-resistance, flexibility at 50° F., etc.

One object of the present invention is to provide polyurethane flocking adhesives having good open or tack time.

Another object of the present invention is to provide polyurethane flocking adhesives having good open or tack time, good body and controlled permeation rates.

Still another object is to provide polyurethane flocking adhesives such as set forth above which do not become fluid when initially subjected to heat.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

Generally polyurethane flocking formulations are linear-polymer producing compositions comprising a polyisocyanate, usually in the form of a prepolymer, and a polyol. It has now been found that a substantial improvement in the controllability of the permeation rates may be made while providing good open times by adding a small amount of a reactive diamine, i.e., primary or secondary amines, selected from the groups consisting of aliphatic diamines comprising at least one secondary amino group, cycloaliphatic diamines, aromatic diamines, mixed alkyl cycloaliphatic diamines, i.e., one amino group is on the alkyl radical and the second amino group is on the cycloaliphatic radical, and mixed alkyl aromatic diamines (one amino group on the alkyl and one amino group on the aromatic portion). Particularly useful results have been obtained using aromatic diamines.

The amount of reactive diamine necessary to provide useful results is, as pointed out above, small. Usually, less than 0.20 equivalent of the diamine are used per equivalent of the polyisocyanate. In preferred embodiments about 0.15 to 0.01 equivalent of the reactive diamine are used per equivalent of the polyisocyanate. Especially useful results were obtained using about 0.10 to about 0.01 equivalent of the reactive diamine per equivalent of the polyisocyanate.

Reactive amines for use in the compositions of the present invention may be selected broadly from the above mentioned primary and secondary diamines provided as pointed out above that in using an aliphatic diamine, at least one of the amino groups should be a secondary amino group. Thus for example, in choosing an aromatic amine, the reactive amino groups may be on the same ring, e.g., a phenylene diamine, on the same or different rings of fused aromatic compounds e.g., naphthalene diamines or on the same or different rings of polyphenyl compounds, i.e., compounds comprising two or more phenyl groups which may be joined directly to one another, e.g., diphenyl or which may be joined through inert (unreactive with isocyanato groups) bivalent radicals, e.g., alkylene, ether, keto and tertiary amine radicals. The cycloaliphatic, mixed alkyl cycloaliphatic and mixed alkyl aromatic diamines may be similarly broadly chosen. As will be understood the compounds bearing the reactive amino groups may be substituted by other inert substituents e.g., halogen, alkyl, alkoxy, keto, tertiary amino and cyano groups. As examples of diamines useful in the compositions of the present invention mention may be made of p,p'-diamino-diphenylmethane;
p,p'-diaminodiphenyl;
3,4-diamino-toluene;
4,4'-diamino-3,3'-dichloro-diphenylmethane;
2,4-diamino-toluene;
2,5-diamino-toluene;
1,2-diamino-benzene;
1,3-diamino-benzene;
1,4-diamino-benzene;
1,2-diamino-naphthalene;
2,3-diamino-naphthalene;
1,4-diamino-naphthalene;
1,5-diamino-naphthalene;
1,8-diamino-naphthalene;
2,7-diamino-naphthalene;
1-methoxy-2,5-diamino-benzene;
4,4'-diamino-benzophenone;
2,2'-diamino-benzophenone;
2,4'-diamino-diphenyl;
3,3'-diamino-diphenyl;
4,4'-diamino-diphenylethane;
4,4'-diamino-diphenylether;
4,4'-diamino-diphenyl-methylamine;
4,4'-diamino-stilbene-p-methylamino-aniline;
p-bis-methylamino-benzene;
p-aminodiphenylamine;
p-aminobenzyl-amine;
1,4-diaminocyclohexane;
1-amino-4-methylaminocyclohexane;
4,4'-diaminodicyclohexyl;
2-(p-aminophenyl)-ethyl-amine;
3-(p-aminophenoxy)-propylamine;
N,N'-diethyl-ethylene-diamine;
N-methyl-ethylene-diamine;
N,N'-diethyl-1,4-pentane-diamine;
N-methyl-1,3-propanediamine;
N,N'-dimethyl-1,3-propanediamine;
4-amino-methylcyclohexylamine;
2-amino-5-methylaminotoluene;
4-chloro-1,2-phenylenediamine;
4,4'-bis-(methylamino)-benzophenone;
p,p'-methylene-bis-(N-methyl-aniline);
N-phenyl-ethylenediamine and
N-(2-aminoethyl)-m-toluidene.

The polyisocyanates for use in the composition of the present invention may be selected from the various materials of this nature available. As examples of such materials mention may be made of: (A) alkane diisocyanates such as ethylene diisocyanate; butylene-1,3-diisocyanate; and decamethylene diisocyanate; (B) alkane diisocyanates such as 1-propene 1,2-diisocyanate and 1-butene-1,3-diisocyanate; (C) cycloalkylene diisocyanates such as cyclopentylene-1,3-diisocyanate and cyclohexylene-1,4-diisocyanate; (D) alkylidene diisocyanates such as ethylidene diisocyanate and propylidene-1,1-diisocyanate; (E) cycloalkylidene diisocyanates such as cyclopentylidene diisocyanate and cyclohexylidene diisocyanate; and (F) aromatic diisocyanates such as m-phenylene diisocyanate; o-phenylene diisocyanate; p-phenylene diisocyanate; 2,4-tolylene diisocyanate; 2,6-tolylene diisocyanate; naphthylene-1,4-diisocyanate; diphenylene-4,4'-diisocyanate; 4,4'-diphenylmethane diisocyanate; naphthylene 1,5-diisocyanate; 2,2'-propylene-bis-(4-phenylisocyanate); xylene-1,4-diisocyanate and xylene-1,3-diisocyanate. Particularly useful results have been obtained using diisocyanates and especially aryl diisocyanates.

The polyols for use in the compositions of the present invention are usually selected from linear-polymer producing materials i.e., diols or high molecular weight triols e.g., triols having molecular weights between about 675 to 6000. The molecular weight of the diols generally may be varied to suit particular needs. The preferred diols for use in the compositions of the present invention are those which have molecular weights between about 700 and 2500 and the preferred triols are those which have molecular weights between 2000 and 4000. Especially useful results have been obtained using alkylene and polyoxyalkylene glycols and triols. As examples of useful diols and triols mention may be made of ethylene glycol, propylene glycol; 1,3-butylene glycol; 2-methyl-2,4-pentanediol; 2-ethyl-1,3-hexanediol; hexamethylene glycol; decamethylene glycol; diethylene glycol; triethylene glycol; tetraethylene glycol; polyethylene glycols having molecular weights of about 200, 300, 400, 600, 1000, 1500, 2000 and 4000; polyoxypropylene diols having molecular weights of about 410, 710, 1010, and 2010, polyoxypropylene triol derivatives of glycerol having molecular weights of about 2000 and 3000, polyoxypropylene triol derivatives of trimethylolpropane having molecular weights of about 740, 1540, 2540 and 4040 and polyoxyethylene triol derivatives of trimethylolpropane having molecular weights of about 1000, 1500, 2000, 2500 and 3000. Especially useful results have been obtained using a mixture of the diols and triols. For increased water resistant, it is preferable to use propylene rather than ethylene based polyols.

In the preferred compositions of the present invention a portion of the polyol is reacted with the polyisocyanate to form a prepolymer comprising reactive isocyanato groups. Usually, the amount of polyol so reacted may be varied to suit particular needs. However, it has been generally found that prepolymers comprising between about 6% and 15% by weight of reactable isocyanato groups and having viscosity between about 500 to 4000 cps. are particularly useful. Especially good results were obtained using prepolymers comprising about 10% by weight of reactable isocyanato groups and having viscosities of about 2000 centipoises.

Generally the amount of hydroxyl groups used in the compositions in addititon to those used in preparing the prepolymers may be varied to suit particular needs. Usually, good results are obtained by using about 0.01 to about 0.99 hydroxyl group per reactive isocyanato groups remaining in the prepolymer. In preferred embodiments about 0.09 to 0.04 hydroxyl group per reactive isocyanato groups are used.

As pointed out above the flocking compositions of the present invention are set or cured subsequent to the application of the flock. In preferred embodiments the flocking compositions comprise a catalyst to promote setting. Usually, the catalyst may be selected from those generally used to promote polyurethane polymerizations such for example as the organometals. As examples of useful catalysts mention may be made of lead naphthenate, cobalt naphthenate dibutyl tin dilaurate, stannous octoate, stannous oleate and tetraphenyl tin. Usually, good results may be obtained by using about 2 to 15 millimoles of the catalyst per mole of active isocyanato groups present. Employing a catalyst, it was generally found that the flocking compositions are set in about 10 to 20 minutes when heated to temperatures of about 100° C.

The following non-limiting examples illustrate the compositions of the present invention.

EXAMPLE 1

A prepolymer was prepared having 10% by weight reactable isocyanato groups and a visocsity of about 2000 centipoises by reacting tolylene diisocyanate with a mixture of (a) polyoxypropylene having a molecular weight of 2000 and (b) a polyoxypropylene triol having a molecular weight of 3000. To ten parts by weight of the prepolymer there was added one part by weight of polyoxypropylene glycol having a molecular weight of about 1000 and comprising 0.07 part by weight of p,p'-diamino-diphenylmethane and 0.08 part by weight of dibutyl tin dilaurate as a catalyst. After stirring for about a minute the composition took on a paste-like consistency. When the paste was applied to a porous base it had a slow rate of permeation and a tack time of about one-half hour. It set in about 14 minutes at 100° C.

EXAMPLE 2

Compositions were made up in a manner similar to Example 1 except that one part of the polyoxypropylene glycol composition was added to 3, 4, 6, 8 and 20 parts by weight respectively of the prepolymer. After mixing for about one to ten minutes the compositions took on a paste-like consistency, had slow permeation rates through the porous base and had open times of from about 15 minutes to 2 hours. They all cured at 100° C. in less than 20 minutes.

EXAMPLE 3

A composition was made up in a similar manner to Example 1 except that .04 part by weight of metatoluene-diamine was used in place of the p,p'-diamino-diphenyl-methane in the polyoxypropylene glycol composition. The resulting composition had a paste-like consistency, slow permeation rate through the porous base, and an open time of at least one-half hour.

EXAMPLE 4

A composition was made up in a similar manner to Example 1 except that 0.03 part by weight of meta-phenylene diamine was used in place of the p,p'-diamino-diphenylmethane. The resulting paste had controlled permeation through the porous base and had an open time of at least one-half hour.

EXAMPLE 5

A composition was made up in a manner similar to Example 1 except that 0.10 part by weight of 1,8-di-aminomethane (a mixed cycloalkyl-alkyl diamine) was used in place of the p,p'-diamino-diphenylmethane. The resulting paste had controlled permeation through the porous base and had open time of at least 15 minutes.

EXAMPLE 6

A composition was made up in a manner similar to Example 1 except that 0.3 part by weight of 1,5-diamino-naphthalene was used in place of the p,p'-diamino-diphenylmethane. The resulting paste had controlled permeation through the porous base and had open time of at least one-half hour.

EXAMPLE 7

To ten parts by weight of a prepolymer such as employed in Example 1, there was added 2.5 parts by weight of a composition comprising 2.0 parts by weight of polyoxypropylene glycol having a molecular weight of about 1000, 0.3 part by weight of 4,4'-methylene-bis(2-chloro-aniline) and 0.2 part by weight of dibutyl tin dilaurate. After mixing for 45 minutes the composition had a paste-like consistency and had open time of at least one-half hour.

EXAMPLE 8

To ten parts by weight of a prepolymer such as employed in Example 1, there was added 2.5 parts by weight of a composition comprising 2.17 parts of polyoxypropylene glycol having a molecular weight of about 1000, 0.11 part by weight of N-methyl-ethylene-diamine and 0.22 part by weight of dibutyl tin dilaurate. After mixing for about 8 to 10 seconds the composition had a paste-like consistency and had open time of at least 15 minutes.

All of the above compositions provided good adhesion for the flock, including nylon and did not flow when initially subjected to the curing temperatures.

When primary aliphatic diamines such as ethylene-diamine were substituted in the above compositions the resulting products were lumpy and could not be utilized. Monoamines such as aniline and polyamines such as tetraethylene pentamine also could not be utilized.

It should be understood that when desired the composition of the present invention may comprise other reagents such as for example, surfactants, pigments, plasticizers, etc.

In the above example burlap, i.e., woven jute was used as the base material. It should be understood that any suitable material may be used for this purpose such for example as wool, cotton, paper, rayon, nylon, etc.

Since certain changes may be made in the above process without departing from the scope of the invention herein involved, it is intended that all matter contained in the above description shall be interpreted as illustrative and not in a limiting sense.

What is claimed is:

1. In a process for preparing flocked materials including the steps of coating a porous base with a film of a flocking adhesive, applying flock to said coated base, orienting said flock so that a substantial portion of the lengths of said flock are generally perpendicular to said base, and curing said adhesive to set said flock in said oriented position, the improvement which comprises utilizing as a flocking adhesive a pasty composition consisting essentially of (a) a prepolymer having reactable isocyanato groups therein; (b) a linear-polymer-forming polyol; and (c) a diamine in which both amino groups are reactive with said isocyanate groups of said prepolymer set forth in (a), and being present in an amount sufficient to prevent the pasty composition from becoming liquid when exposed to heat, and to provide sufficient body to hold the flock into the oriented state prior to the cure to have controlled permeation through a porous base and improved tack-time, said diamine being selected from the group consisting of cycloaliphatic diamines, aromatic diamines, mixed alkyl-cycloaliphatic diamines, mixed alkyl-aromatic diamines and aliphatic diamines in which at least one of the amino groups in said aliphatic diamines is secondary, about 0.20 to 0.01 equivalent of said diamine being present for each equivalent of reactable isocyanate groups in said prepolymer set forth in (a), and about 0.01 to 0.99 hydroxyl group being present in said linear-polymer-forming polyol set forth in (b) per reactable isocyanato group in said prepolymer set forth in (a).

2. The process of claim 1 wherein about 0.15 to 0.01 equivalent of said diamine are present for each equivalent of reactable isocyanato groups in said prepolymer set forth in (a).

3. The process of claim 1 wherein said diamine is an aromatic diamine.

4. The process of claim 3 wherein said aromatic diamine is a phenylene diamine.

5. The process of claim 3 wherein said aromatic diamine is a polyphenyl diamine.

6. The process of claim 3 wherein said aromatic diamine is naphthalene diamine.

7. The process of claim 1 wherein said diamine is a mixed alkyl-cycloaliphatic diamine.

8. The process of claim 1 wherein said diamine is p,p'-diamino-diphenylmethane.

9. The process of claim 1 wherein said linear-polymer-forming polyol is selected from the group consisting of polyoxypropylene diols and polyoxypropylene triols.

10. The process of claim 1 further including in said composition an organometallic catalyst.

11. The process of claim 1 wherein said prepolymer set forth in (a) is the reaction product of an excess of a diisocyanate and at least one linear-polymer-forming polyol selected from the group consisting of diols and high molecular weight triols and said linear-polymer-forming polyol set forth in (b) is selected from the group consisting of diols and high molecular weight triols.

12. The process of claim 1 wherein said prepolymer set forth in (a) is the reaction product of an excess of a diisocyanate and at least one linear-polymer-forming polyol selected from the group consisting of diols and triols, said triols having a molecular weight between about 675 and 6000, said prepolymer having a viscosity between about 500 and 4000 centipoises and between about 6 percent and 15 percent by weight of reactable isocyanato groups, said linear-polymer-forming polyol set forth in (b) being selected from the group consisting of diols and triols, said triols having a molecular weight between 675 and 6000.

13. The process of claim 12 wherein said prepolymer comprises about 10 percent by weight of reactable isocyanato groups and has a viscosity of about 2000 centipoises.

14. The process of claim 12 wherein said linear-polymer-forming polyol is selected from the group consisting of polyoxypropylene diols and polyoxypropylene triols.

References Cited

UNITED STATES PATENTS

| | | | |
|---|---|---|---|
| 2,776,223 | 1/1957 | Brown et al. | 117—33 |
| 3,085,896 | 4/1963 | Britt et al. | 117—33 |
| 3,098,755 | 7/1963 | Barth et al. | 117—33 |

WILLIAM D. MARTIN, Primary Examiner

R. M. SPEER, Assistant Examiner

U.S. Cl. X.R.

117—17, 161; 260—77.5, 858